US012073760B2

(12) United States Patent
Lyu

(10) Patent No.: US 12,073,760 B2
(45) Date of Patent: Aug. 27, 2024

(54) METHOD FOR DRIVING DISPLAY PANEL, DEVICE FOR DRIVING DISPLAY PANEL, AND DISPLAY DEVICE

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventor: Bojia Lyu, Wuhan (CN)

(73) Assignees: WUHAN TIANMA MICRO-ELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/453,658

(22) Filed: Aug. 22, 2023

(65) Prior Publication Data

US 2023/0395012 A1 Dec. 7, 2023

(30) Foreign Application Priority Data

Jan. 31, 2023 (CN) ......................... 202310099081.4

(51) Int. Cl.
*G09G 3/20* (2006.01)

(52) U.S. Cl.
CPC ......... *G09G 3/2074* (2013.01); *G09G 3/2022* (2013.01); *G09G 2310/08* (2013.01); *G09G 2320/0673* (2013.01); *G09G 2330/021* (2013.01)

(58) Field of Classification Search
None
See application file for complete search history.

(56) References Cited

U.S. PATENT DOCUMENTS

2011/0148947 A1 * 6/2011 Chen .................... G09G 3/2025 345/690

FOREIGN PATENT DOCUMENTS

CN 110379368 A 10/2019

OTHER PUBLICATIONS

Chinese Office Action mailed Mar. 13, 2024, issued in related Chinese Application No. 202310099081.4, filed Jan. 31, 2023, 14 pages.

* cited by examiner

*Primary Examiner* — Christopher J Kohlman
(74) *Attorney, Agent, or Firm* — CHRISTENSEN O'CONNOR JOHNSON KINDNESS PLLC

(57) ABSTRACT

A method and a device for driving a display panel, and a display device are provided. The method including dividing a frame into N sub-frames, the N sub-frames corresponding to N sets of first gamma curves respectively, and the N sub-frames including at least two consecutive first sub-frames; obtaining a display grayscale of a sub-pixel in each first sub-frame based on an original grayscale of a sub-pixel in a frame image to be displayed, a set of second gamma curves, and one set of first gamma curves corresponding to the first sub-frame; and driving the display panel to display sub-frame images sequentially during the N sub-frames. A display voltage of the sub-pixel when the display panel displays one sub-frame image during one first sub-frames is obtained based on the set of second gamma curves and the display grayscale of the sub-pixel in the first sub-frame.

20 Claims, 8 Drawing Sheets

METHOD FOR DRIVING DISPLAY PANEL, DEVICE FOR DRIVING DISPLAY PANEL, AND DISPLAY DEVICE

CROSS-REFERENCE TO RELATED APPLICATIONS

The present disclosure claims priority to Chinese Patent Application No. 202310099081.4, filed on Jan. 31, 2023, the content of which is incorporated herein by reference in its entirety.

TECHNICAL FIELD

The present disclosure relates to the field of display technology, in particular, to a method for driving a display panel and a device for driving a display panel, and a display device.

BACKGROUND

In related art, when driving a display panel with an organic light emitting diode (OLED), mini light emitting diode (Mini-LED), or micro light emitting diode (Micro-LED) etc., there is a problem of frequent gamma switching, which is not conducive to achieving high-frequency display of the display panel.

SUMMARY

In an aspect, an embodiment of the present disclosure provides a method for driving a display panel. The method for driving the display panel includes: dividing a frame into N sub-frames, the N sub-frames corresponding to N sets of first gamma curves respectively, the N sub-frames including at least two consecutive first sub-frames, and at least two of the at least two consecutive first sub-frames corresponding to different sets of first gamma curves of the N sets of first gamma curves, where N≥2; obtaining a display grayscale of a sub-pixel in each first sub-frame of the at least two consecutive first sub-frames based on an original grayscale of the sub-pixel in a frame image to be displayed, a set of second gamma curves, and one set of first gamma curves of the N first gamma curves corresponding to the first sub-frame; and driving the display panel to display sub-frame images sequentially during the N sub-frames, respectively, where a display voltage of the sub-pixel when the display panel displays one of the sub-frame images during one of the at least two consecutive first sub-frames is obtained based on the set of second gamma curves and the display grayscale of the sub-pixel in the first sub-frame.

In another aspect, an embodiment of the present disclosure provides a device for driving a display panel. The device for driving the display panel includes: a division circuit configured to divide a frame into N sub-frames, the N sub-frames corresponding to N sets of first gamma curves respectively, the N sub-frames including at least two consecutive first sub-frames, and at least two of the at least two consecutive first sub-frames corresponding to different sets of first gamma curves of the N sets of first gamma curves, where N≥2; an original grayscale obtaining circuit configured to obtain an original grayscale of a sub-pixel based on a frame image to be displayed; a data processing circuit electrically connected to the division circuit and the original grayscale obtaining circuit, and configured to obtain a display grayscale of the sub-pixel in each first sub-frame of the at least two consecutive first sub-frames based on the original grayscale of the sub-pixel in the frame image to be displayed, a set of second gamma curves, and one set of first gamma curves of the N sets of first gamma curves corresponding to the first sub-frame; and a driving circuit electrically connected to the division circuit and the data processing circuit, and configured to drive the display panel to display sub-frame images sequentially during the N sub-frames, and obtain a display voltage of the sub-pixel when the display panel displays one of the sub-frame images during one of the at least two consecutive first sub-frames based on the set of second gamma curves and the display grayscale of the sub-pixel in the first sub-frame.

In still another aspect, an embodiment of the present disclosure provides a display device including a display panel and a device for driving a display panel. The device for driving the display panel includes: a division circuit configured to divide a frame into N sub-frames, the N sub-frames corresponding to N sets of first gamma curves respectively, the N sub-frames including at least two consecutive first sub-frames, and at least two of the at least two consecutive first sub-frames corresponding to different first sets of gamma curves of the N sets of first gamma curves, where N≥2; an original grayscale obtaining circuit configured to obtain an original grayscale of a sub-pixel based on a frame image to be displayed; a data processing circuit electrically connected to the division circuit and the original grayscale obtaining circuit, and configured to obtain a display grayscale of the sub-pixel in each first sub-frame of the at least two consecutive first sub-frames based on the original grayscale of the sub-pixel in the frame image to be displayed, a set of second gamma curves, and one set of first gamma curves of the N sets of first gamma curves corresponding to the first sub-frame; and a driving circuit electrically connected to the division circuit and the data processing circuit, and configured to drive the display panel to display sub-frame images sequentially during the N sub-frames, and obtain a display voltage of the sub-pixel when the display panel displays one of the sub-frame images during one of the at least two consecutive first sub-frames based on the set of second gamma curves and the display grayscale of the sub-pixel in the first sub-frame.

BRIEF DESCRIPTION OF DRAWINGS

In order to better illustrate technical solutions in embodiments of the present disclosure or in the related art, the accompanying drawings used in the embodiments and in the related art are briefly introduced as follows. The drawings described as follows are merely part of the embodiments of the present disclosure, and other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

The described embodiments are merely some, rather than all, of the embodiments of the present disclosure. Those skilled in the art should understand that various modifications and variations can be made based on the embodiments of the present disclosure without departing from the principle of the present disclosures, and all of these modifications and variations shall fall within a scope of the present disclosure. The embodiments of the present disclosure can be combined with each other if there is no conflict.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

The term "and/or" used herein is merely an association relationship describing associated objects, indicating that there may be three relationships, for example, A and/or B may indicate that three cases, i.e., A alone, A and B, B alone. The character "/" herein generally indicates that the related objects before and after the character form an "or" relationship.

In the related art, an OLED display panel, a Mini-LED display panel and a Micro-LED display panel can be driven by means of pulse amplitude modulation (PAM).

In a method for driving a display panel, one frame can be divided into N sub-frames, and a set of gamma curves can be configured for each sub-frame of the N sub-frames. Then, the display panel can be controlled to display images sequentially during the N sub-frames based on an original grayscale of the sub-pixel in a frame image to be displayed and the set of gamma curves corresponding to each sub-frame.

Figure 1:
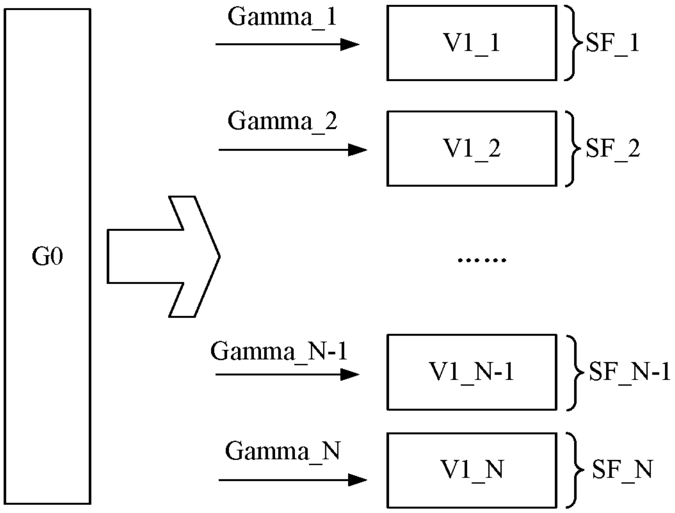
FIG. 1 is a schematic diagram of a driving process for a display panel in the related art.
Figure 2:
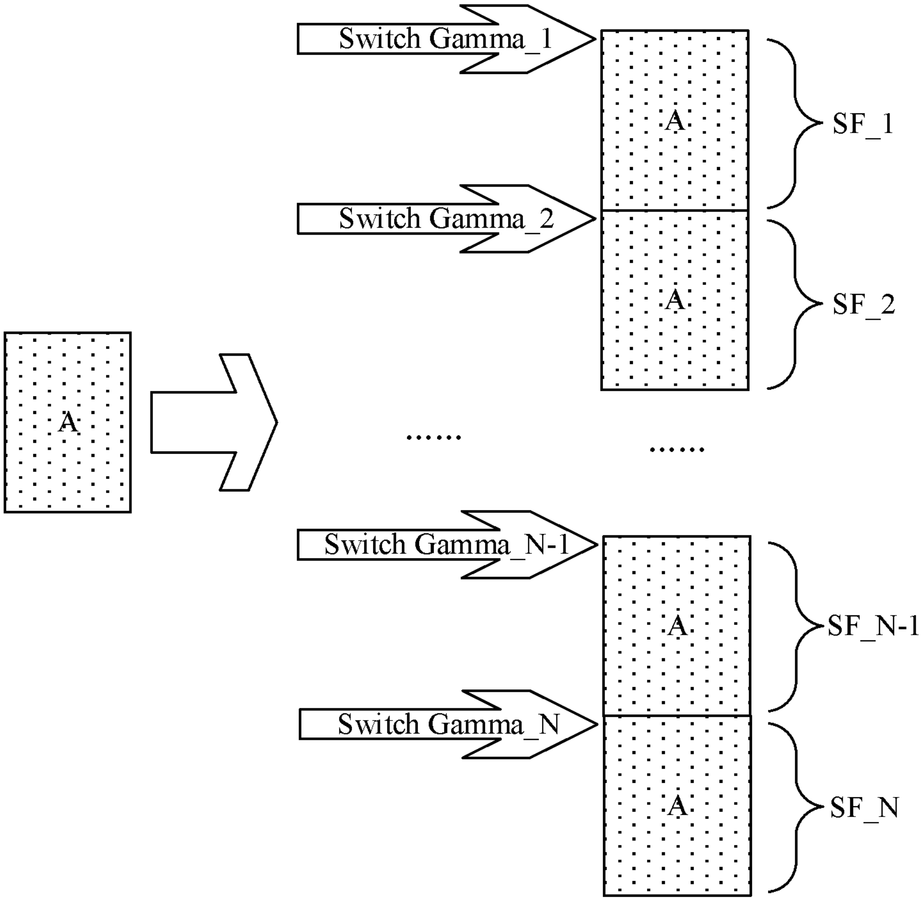
FIG. 2 is a schematic diagram of a display panel sequentially displaying images during N sub-frames in the related art.

FIG. 1 is a schematic diagram of a driving process for a display panel in the related art. FIG. 2 is a schematic diagram of a display panel sequentially displaying images during N sub-frames in the related art. FIG. 2 is a schematic illustration of an example in which a graphic "A" is displayed on a frame image to be displayed. Before controlling the display panel to display an image, an original grayscale G0 corresponding to each sub-pixel is first obtained based on the image data of the frame image to be displayed, and then the display panel is controlled to display images sequentially during N sub-frames SF. When controlling the display panel to display images during different sub-frames SF, the gamma configuration is first modulated to switch a set of gamma curves to another set of gamma curves Gamma corresponding to the sub-frame SF to be displayed, and then the original grayscale G0 corresponding to each sub-pixel is converted into corresponding display voltage V1 based on the another set of gamma curves Gamma corresponding to the sub-frame SF.

For clarity, as shown in FIG. 1 and FIG. 2, an i-th sub-frame is represented by a reference sign SF_i, the set of gamma curves corresponding to the i-th sub-frame SF_i are represented by a reference sign Gamma_i, and the display voltage corresponding to the i-th sub-frame SF_i is represented by a reference sign V1_*i*, where i is a positive integer within a range from 1 to N.

However, in combination with FIG. 2, since different sub-frames SF correspond to different sets of gamma curves Gamma, the display panel perform gamma switching when displaying images during each of the sub-frames SF. As a result, the gamma configuration may be switched frequently within one frame, and the amount of data to be stored is also large. With the driver chip, it takes certain time when switching the gamma curve configuration, and the driver chip cannot satisfy the high-frequency switching for the sub-frame SF. Therefore, it brings difficulties and challenges in terms of the design of the driver chip.

In this regard, an embodiment of the present disclosure provides a method for driving a display panel, which can effectively overcome the above problem of frequent switching of the gamma curves.

Figure 3:
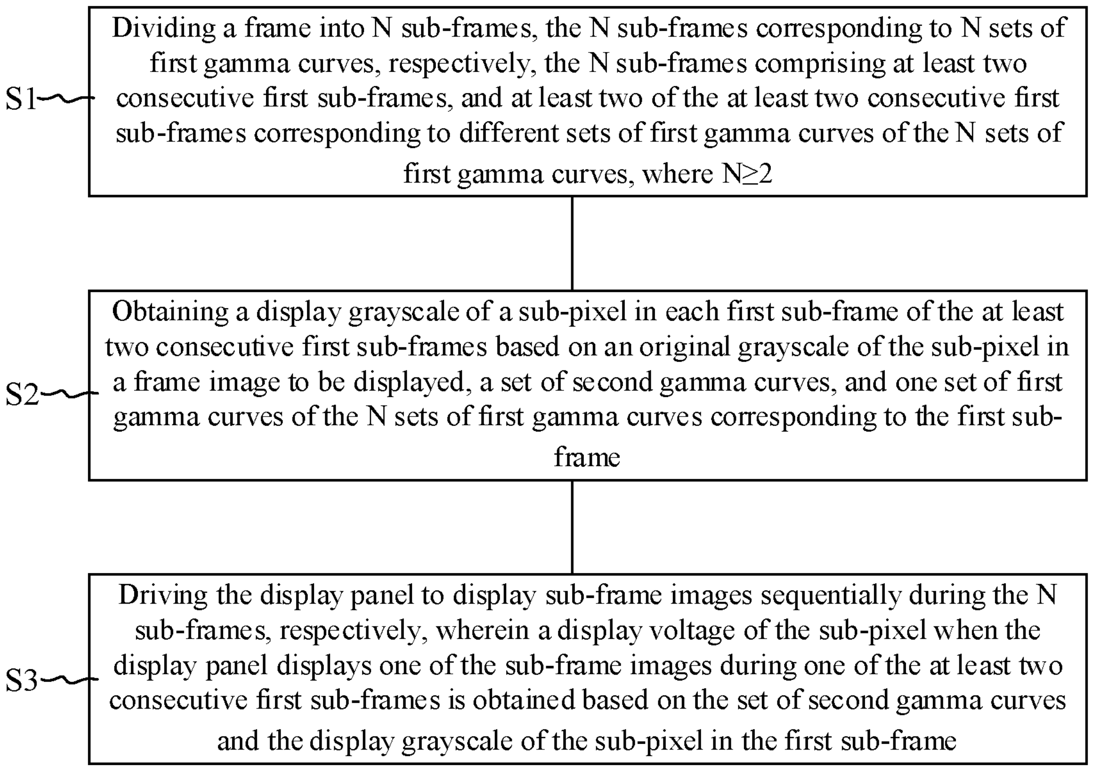
FIG. 3 is a flowchart of a method for driving a display panel according to an embodiment of the present disclosure.
Figure 4:
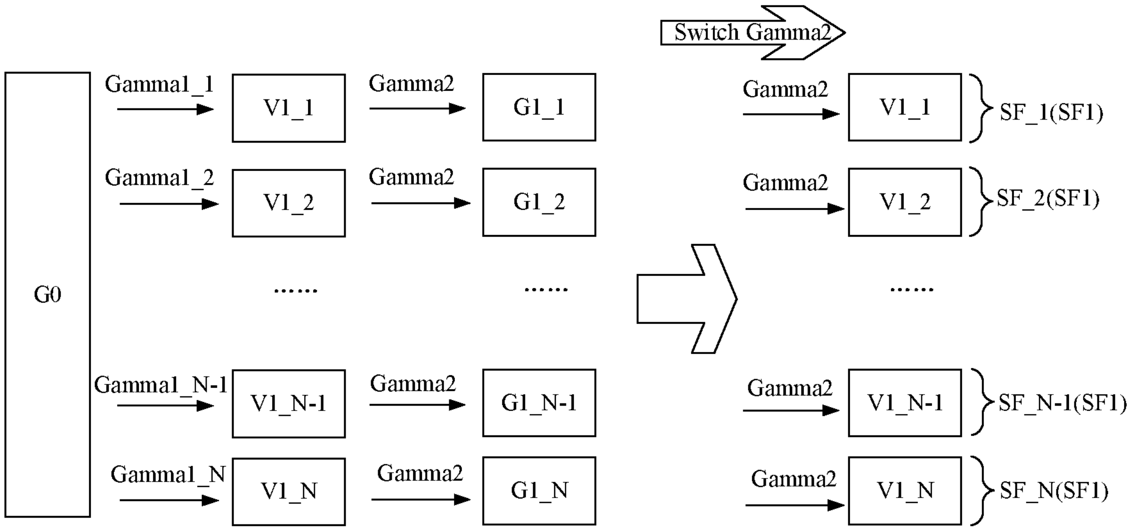
FIG. 4 is a schematic diagram of a driving process of a display panel according to an embodiment of the present disclosure.
Figure 5:
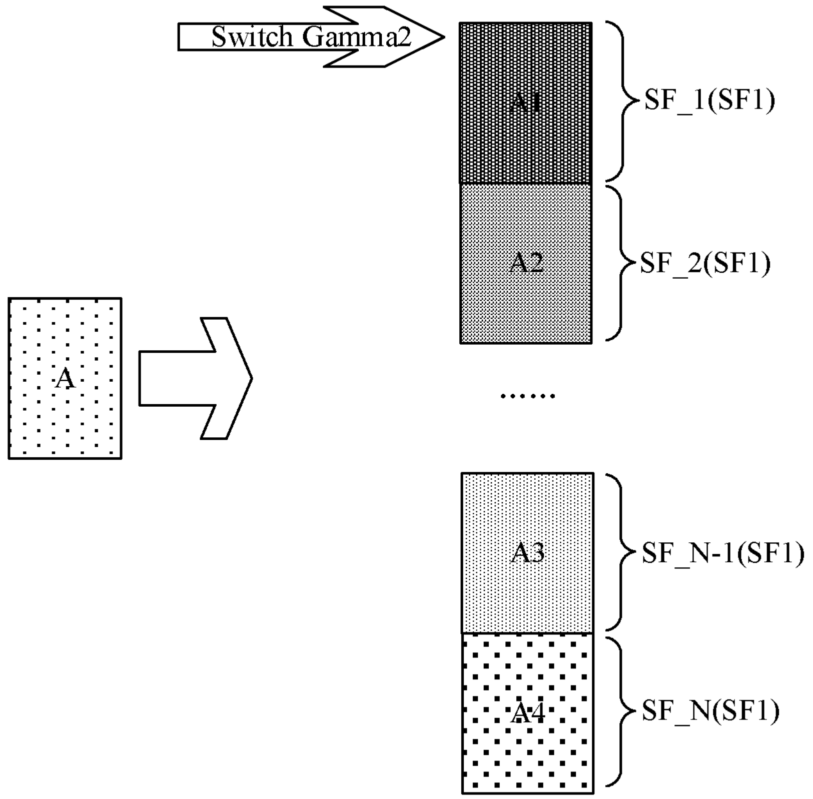
FIG. 5 is a schematic diagram of a display panel sequentially displaying images during N sub-frames according to an embodiment of the present disclosure.

FIG. 3 is a flowchart of a method for driving a display panel according to an embodiment of the present disclosure. FIG. 4 is a schematic diagram of a driving process of a display panel according to an embodiment of the present disclosure. FIG. 5 is a schematic diagram of a display panel sequentially displaying images during N sub-frames according to an embodiment of the present disclosure. As shown in FIG. 3 and FIG. 4, the method for driving a display panel includes steps S1, S2, and S3.

At S1, a frame is divided into N sub-frames SF which respectively correspond to N sets of first gamma curves Gamma1. The N sub-frames SF include at least two consecutive first sub-frames SF1, and at least two of the first sub-frames SF1 correspond to different sets of first gamma curves Gamma1, where N≥2.

At S2, a display grayscale G1 of a sub-pixel in each first sub-frame SF1 is obtained based on an original grayscale G0 of the sub-pixel in the frame image to be displayed, a set of second gamma curves Gamma2, and one set of first gamma curves Gamma1 of N sets of first gamma curves corresponding to each first sub-frame SF1.

At S3, the display panel is driven to display sub-frame images sequentially during N sub-frames SF. A display voltage V1 of the sub-pixel when the display panel displays a sub-frame image during the first sub-frame SF1 is obtained based on the set of second gamma curves Gamma2 and the display grayscale G1 of the sub-pixel in the first sub-frame SF1.

The display voltage V1 of the sub-pixel obtained at step S3 can be converted by a digital-to-analog converter (DAC) into a data voltage that can be received by the display panel. Then, the data voltage is written into the sub-pixel to control the sub-pixel in the display panel to emit light, so that the display panel displays a sub-frame image.

For clarity, in the drawings corresponding to the embodiments of the present disclosure, an i-th sub-frame is represented by a reference sign SF_i, the set of gamma curves Gamma1 corresponding to the i-th sub-frame SF are represented by a reference sign Gamma1_*i*, and the display voltage V1 corresponding to the i-th sub-frame SF is represented by a reference sign V1_*i*, where i is a positive integer within a range from 1 to N.

For at least two consecutive first sub-frames SF1, if adopting the method for driving the display panel, when the display panel displays images sequentially during all first sub-frames SF1, the gamma configuration is modulated to switch the set of gamma curves to the set of first gamma curves Gamma1 corresponding to the first sub-frame SF1 to be displayed, and then an original grayscale G0 is converted into a display voltage V1 by using the set of first gamma curve Gamma1 corresponding to the first sub-frame SF1.

In the embodiments of the present disclosure, a unified set of second gamma curves Gamma2 are provided. Before controlling the display panel to display an image, the original grayscale G0 is converted by using the set of second gamma curves Gamma2. First, the original grayscale G0 of the sub-pixel in the frame image to be displayed is converted into a display voltage V1 by using the set of first gamma curves Gamma1 corresponding to each first sub-frame SF1, to obtain the display voltage V1 corresponding to the sub-pixel in each first sub-frame SF1. Then, the display voltage V1 corresponding to the sub-pixel in each first sub-frame SF1 is converted into a display grayscale G1 by using a unified set of second gamma curves Gamma2.

Subsequently, when the display panel is driven to display images sequentially during at least two first sub-frames SF1, in each first sub-frame SF1, the display grayscale G1 corresponding to the first sub-frame SF1 is converted into a display voltage V1 by using the unified second gamma curve Gamma2 to obtain the display voltage V1 corresponding to the sub-pixel in the first sub-frame SF1.

In the method for driving the display panel provided by the embodiments of the present disclosure, before controlling the display panel to display an image, the original grayscale G0 is converted by using the set of the second gamma curves Gamma2 to obtain the display grayscale G1 corresponding to each first sub-frame SF1. In this way, when the display panel is driven to display sub-frame images sequentially during the first sub-frames SF1, it only needs to set the set of gamma curves to be the set of second gamma curves Gamma2 at the beginning of the first one of the first sub-frames SF1, and the display voltage V1 corresponding to the sub-pixel in each first sub-frame SF1 can be obtained by only using one unified set of second gamma curves Gamma2 to convert multiple first sub-frames SF1 without gamma switching at the beginning of each first sub-frame SF1. Therefore, the times for switching the set of gamma curves can be greatly reduced, thereby reducing the requirements for the performance of the driver chip, and optimizing the high-frequency display of the display panel.

When the display panel is driven to display an image during the first sub-frame SF1, the display voltage V1 obtained by using the unified set of second gamma curves Gamma2 and the display grayscale G1 corresponding to the first sub-frame SF1 according to the embodiments of the present disclosure is the same as the display voltage V1 obtained directly by using the original grayscale G0 and the set of first gamma curves Gamma1 corresponding to each first sub-frame SF1 according to the above method for driving the display panel in the related art. Therefore, the embodiments of the present disclosure can achieve the same display effect as the related art.

In an example, each of the N sub-frames SF is the first sub-frame SF1. According to the above method for driving the display panel in the related art, with reference to FIG. 1 and FIG. 2, when driving the display panel to display images, the grayscale signals input during the N sub-frames SF are all consistent original grayscales obtained based on the frame image to be displayed, therefore, the display panel displays a same image during the N sub-frames SF. According to the embodiments of the present disclosure, with reference to FIG. 4 and FIG. 5, before driving the display panel to display an image, two conversion is performed on the original grayscale G0, that is, the original grayscale G0 is converted into the display voltage V1, and then the display voltage V1 is converted into a display grayscale G1. In this case, since N sub-frames SF corresponds to N different sets of first gamma curves Gamma1 during the conversion process where the original grayscale G0 is converted into the display voltage V1", the sub-frames SF corresponds to different display voltages V1 converted based on a same original grayscale G0. Then, the sub-frames SF correspond to different display grayscales G1 during the conversion process where the display voltage V1 is converted into the display grayscales G1 based on a same set of second gamma curves Gamma2. That is, in the embodiments of the present disclosure, when the display panel is driven to display images sequentially during the N sub-frames SF, the grayscale signals input in the N sub-frames SF are display grayscale signals corresponding to the N sub-frames SF, respectively. Since different sub-frames SF may correspond to different display grayscales G1, the display panel can display the sub-frame images having different contents during different sub-frames SF.

The method for driving the display panel in the related art may use a same display image with different gamma configurations to display one frame of an image, while the embodiments of the present disclosure may use a same gamma configuration with different display images to display one frame of an image.

In the embodiments of the present disclosure, if the display panel displays a static picture, that is, multiple consecutive frame images to be displayed are the same, then during the i-th sub-frames of different frames, the sub-frame images displayed by the display panel may be the same. In this case, sub-frame images during different frames may have periodicity. If the display panel displays a dynamic picture, that is, multiple consecutive frame images to be displayed are different, then during the i-th sub-frames of different frames, the sub-frame images displayed by the display panel may be different.

In an embodiment of the present disclosure, a set of first gamma curves Gamma1 may include a gamma curve corresponding to a red sub-pixel, a gamma curve corresponding to a green sub-pixel, and a gamma curve corresponding to a blue sub-pixel. Correspondingly, the set of second gamma curves Gamma2 may include a gamma curve corresponding to a red sub-pixel, a gamma curve corresponding to a green sub-pixel, and a gamma curve corresponding to a blue sub-pixel.

Figure 6:
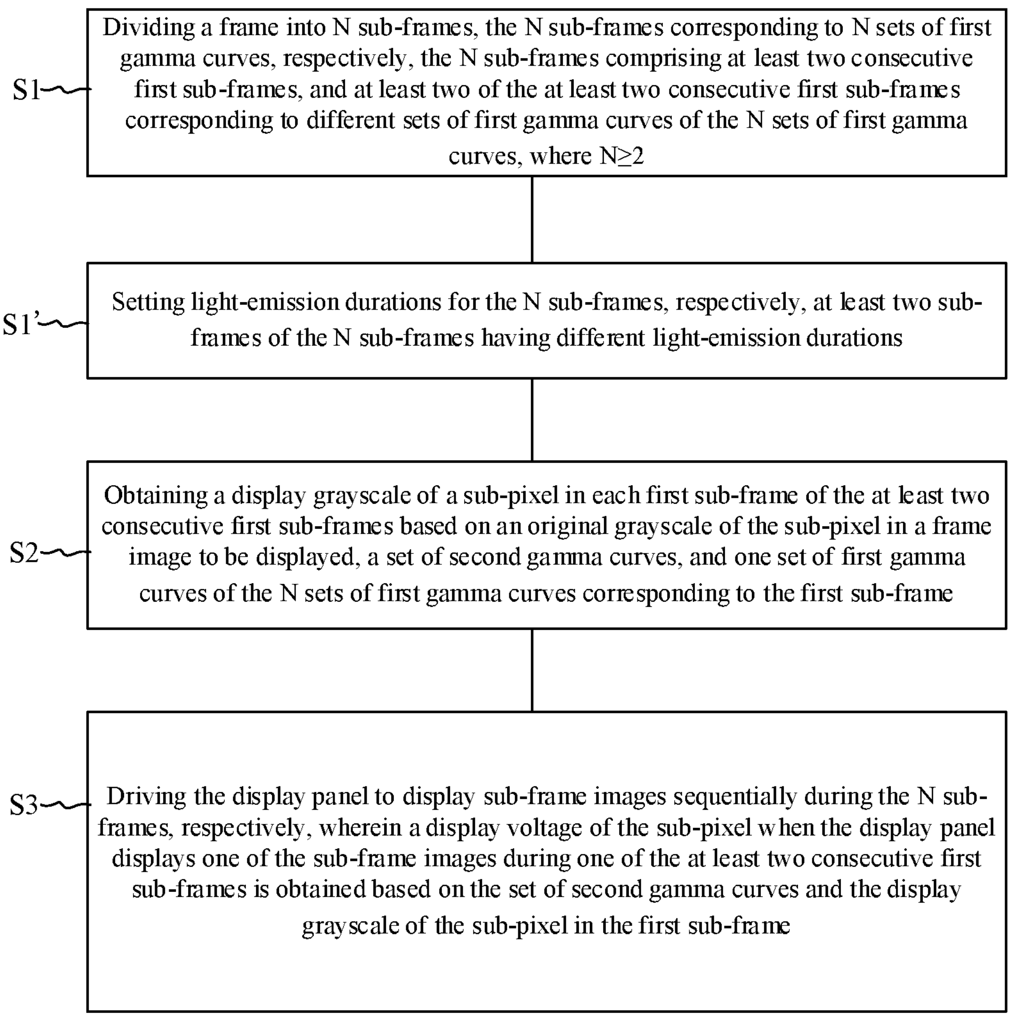
FIG. 6 is another flow chart of a method for driving a display panel according to an embodiment of the present disclosure.
Figure 7:
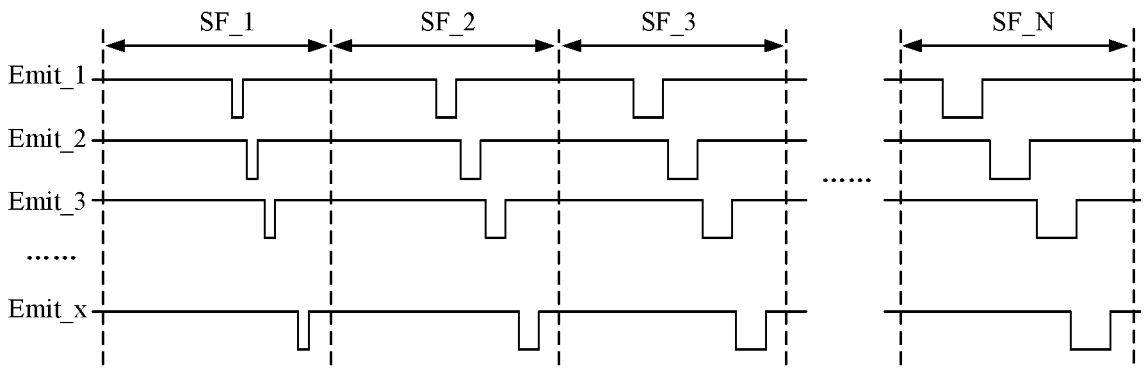
FIG. 7 is a signal timing diagram of light-emission control signals during different sub-frames according to an embodiment of the present disclosure.

FIG. 6 is another flow chart of a method for driving a display panel according to an embodiment of the present disclosure. FIG. 7 is a signal timing diagram of light-emission control signals during different sub-frames SF according to an embodiment of the present disclosure. In an embodiment of the present disclosure, as shown in FIG. 6 and FIG. 7, the method for driving the display panel further includes a step S1', at which light-emission durations are configured for the N sub-frames SF, respectively, and at least two of the sub-frames SF correspond to different light-emission durations.

The step S3 further includes: when the display panel displays a sub-frame image during the sub-frame SF, inputting a light-emission control signal corresponding to the light-emission duration corresponding to a current sub-frame SF to the display panel.

Emit_1 to Emit_x shown in FIG. 7 represent the light-emission control signals corresponding to a $1^{st}$ pixel row to an x-th pixel row, respectively. It can be understood that a time duration of the light-emission duration can be represented by a pulse width of an effective level of the light-emission control signal. The embodiments of the present disclosure are illustrated by taking the effective level of the light-emission control signal as a low level as an example.

Such method for driving the display panel uses the pulse width modulation (PWM) driving and PAM driving to hybrid-drive the display panel. During each sub-frame SF, the display brightness of each sub-pixel in the sub-frame image is jointly determined by the display voltage V1 (or data voltage) of each sub-pixel and the light-emission duration corresponding to the sub-frame SF. That is, the display brightness of the sub-pixel is not only modulated by the magnitude of the data voltage corresponding to the sub-pixel, but also modulated by the time duration of the light-emission duration corresponding to the sub-frame SF. This method for driving the display panel can solve the problem that the gamma grayscale cannot be displayed accurately caused by using only the PWM driving method, and it can also solve the problem of excessive large color gamut deviation of different grayscales and the problem of large power consumption at low grayscales, which are caused by only using the PAM method for driving a display panel alone. Therefore, the display effect can be optimized, for example, the display effect at low grayscales can be significantly optimized.

Figure 8:
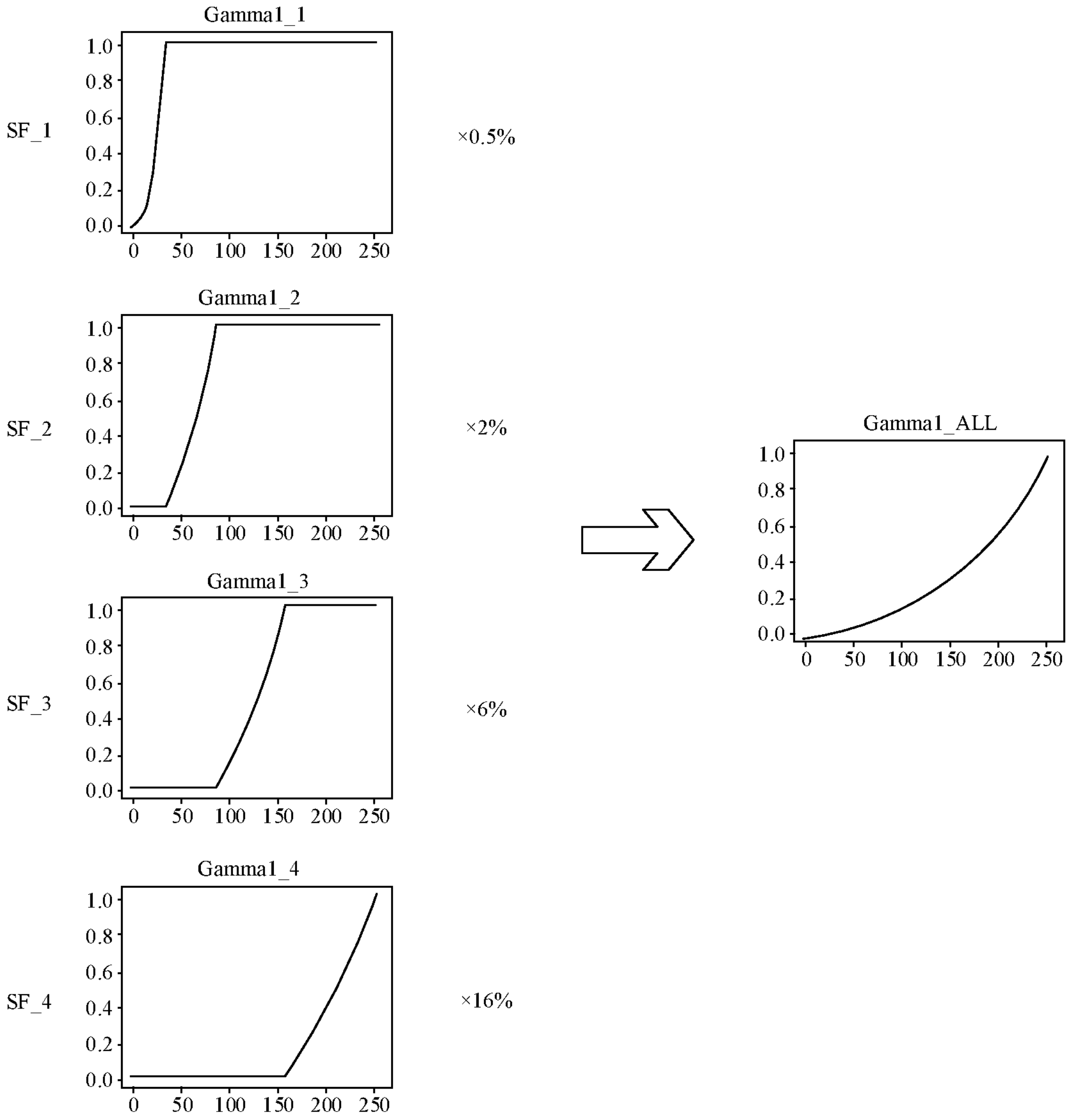
FIG. 8 is a schematic diagram of a first gamma curve corresponding to a single-color sub-pixel during N sub-frames according to an embodiment of the present disclosure.

In the embodiments of the present disclosure, one set of first gamma curves Gamma1 and the light-emission duration for each sub-frame SF are set, so that a picture visible to human eyes after N sub-frame images are superimposed is a frame picture to be displayed that is initially expected to be presented. For example, N=4. FIG. 8 is a schematic diagram of a first gamma curve Gamma1 corresponding to a single-color sub-pixel during N sub-frames SF according to an embodiment of the present disclosure. As shown in FIG. 8, the first gamma curves Gamma1 corresponding to the four sub-frames SF are shown in FIG. 8. It is assumed that the light-emission duration corresponding to the first sub-frame SF_1 accounts for 0.5%, the light-emission duration corresponding to the second sub-frame SF_2 accounts for 2%, the light-emission duration corresponding to the third sub-frame SF_3 accounts for 6%, and the light-emission duration corresponding to the fourth sub-frame SF_4 accounts for 16%. An equivalent gamma curve corresponding to the overall equivalent image presented by superimposing the sub-frame images displayed on the display panel in the four sub-frames SF visually can be shown as Gamma_ALL in FIG. 8. The equivalent gamma curve Gamma_all can be understood as a gamma curve by not dividing one frame into N sub-frames SF, but directly generating display voltage V1 in one frame based on the original grayscale G0 of the sub-pixel in the frame image to be displayed.

When respectively setting the light-emission durations for the N sub-frames SF, with reference to FIG. 7, the light-emission durations corresponding to the N sub-frames SF are different from each other. In this case, one frame includes both a sub-frame SF with a short light-emission duration and a sub-frame SF with a long light-emission duration, and the sub-frame SF with a short light-emission duration can be used to accurately achieve low-grayscale displaying, and the sub-frame SF with a long light-emission duration can be used to achieve high-grayscale displaying.

When respectively setting the light-emission durations for the N sub-frames SF, with reference to FIG. 7, the display grayscales G1 corresponding to the N sub-frames SF increase sequentially, and the light-emission durations corresponding to the N sub-frames SF increase sequentially. In this case, the display grayscales G1 and the light-emission durations corresponding to former sub-frames SF are relatively small. During these former sub-frames SF, the display brightness of the sub-pixel jointly determined jointly by the display voltage V1 (or data voltage) and the light-emission duration is low, and these former sub-frames SF can be used to accurately achieve low-grayscale displaying. The display grayscales G1 and the light-emission durations corresponding to latter sub-frames SF are relatively large. During these latter sub-frames SF, the display brightness of the sub-pixel jointly determined by the display voltage V1 (or data voltage) and the light-emission duration is relatively high, so these latter sub-frames can be used to r achieve high-grayscale displaying, while the number of sub-frames SF by dividing one frame can also be reduced. In an example, if the display brightness of the sub-pixel jointly determined by the display voltage V1 (or data voltage) and the light-emission duration during each sub-frame SF is low, one frame can be divided into a large number of sub-frames SF to achieve a high-grayscale displaying. In this way, a data voltage is written for a lot of times during one frame, leading to large power consumption.

Figure 9:
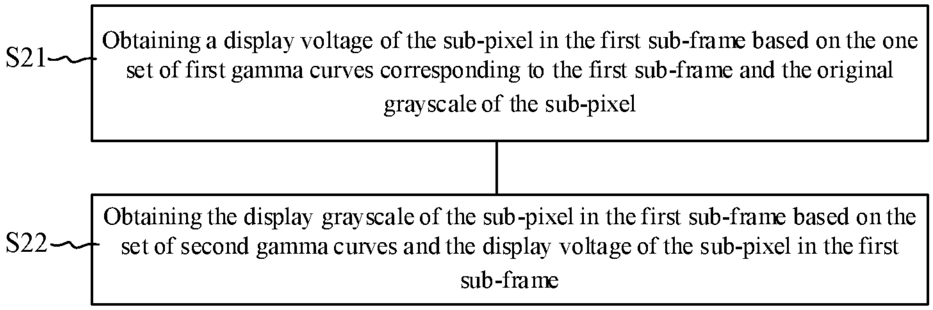
FIG. 9 is another flow chart of a method for driving a display panel according to an embodiment of the present disclosure.

FIG. 9 is another flow chart of a method for driving a display panel according to an embodiment of the present disclosure. In an embodiment of the present disclosure, as shown in FIG. 9, step S2 may include steps S21 and S22.

At S21, the display voltage V1 of the sub-pixel in the first sub-frame SF1 is obtained based on the first gamma curve Gamma1 corresponding to the first sub-frame SF1 and the original grayscale G0 of the sub-pixel. That is, the conversion process where the original grayscale G0 is converted into the display voltage V1 is achieved.

At S22, the display grayscale G1 of the sub-pixel in the first sub-frame SF1 is obtained based on a second gamma curve Gamma2 and the display voltage V1 of the sub-pixel in the first sub-frame SF1. That is, the conversion process where the display voltage V1 is converted into the display grayscale G1 is achieved.

In this case, when the display panel displays the sub-frame images sequentially during consecutive first sub-frames SF1, the display grayscale G1 corresponding to the first sub-frame SF1 is converted by using the second gamma curve Gamma2 during each first sub-frame SF1, and the display voltage V1 obtained after the conversion is the display voltage V1 matching the first gamma curve Gamma1 corresponding to the first sub-frame SF1.

In an embodiment of the present disclosure, in order to improve the accuracy of restoring a frame image to be displayed and reduce a risk of distortion, the second gamma curve Gamma2 may be the same as at least one set of first gamma curves Gamma1.

Figure 10:
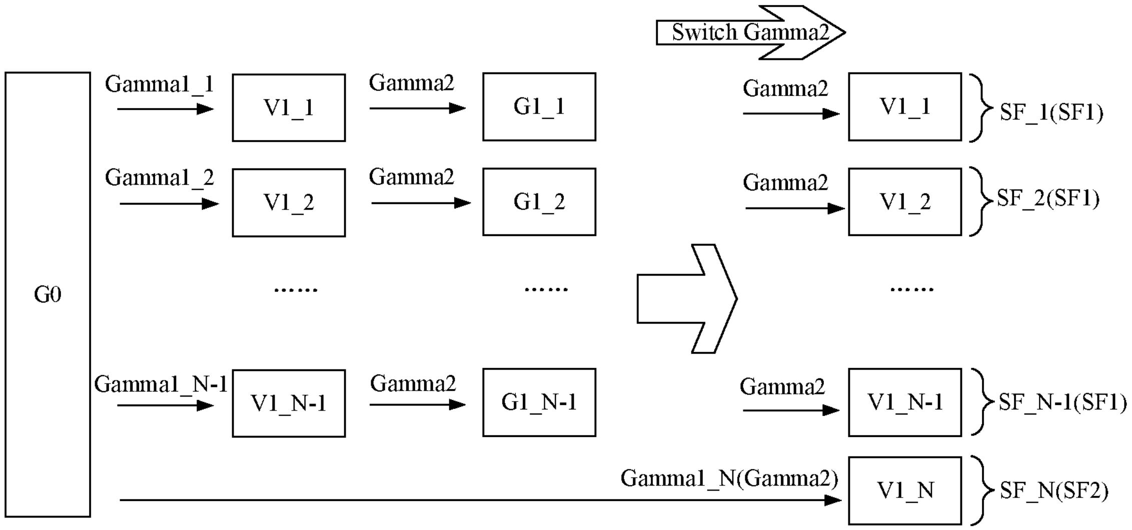
FIG. 10 is a schematic diagram of a driving process for a display panel according to an embodiment of the present disclosure.
Figure 11:
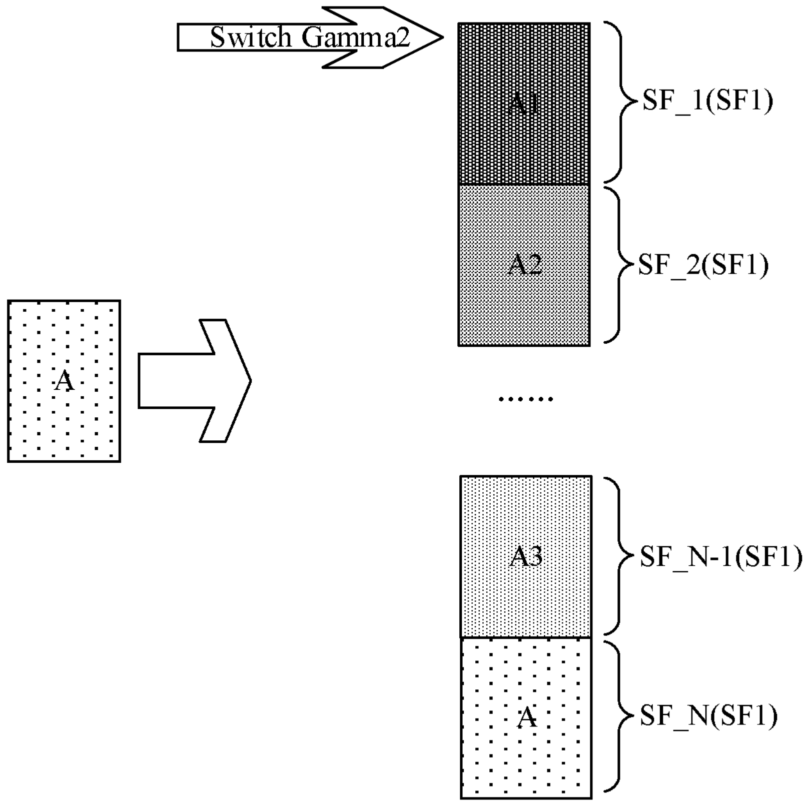
FIG. 11 is another schematic diagram of a display panel sequentially displaying images during N sub-frames according to an embodiment of the present disclosure.

FIG. 10 is a schematic diagram of a driving process for a display panel according to an embodiment of the present disclosure. FIG. 11 is another schematic diagram of a display panel sequentially displaying images during N sub-frames according to an embodiment of the present disclosure. In some embodiments, as shown in FIG. 10 and FIG. 11, the sub-frames SF also includes a second sub-frame SF2, and one set of first gamma curves Gamma1 corresponding to the second sub-frame SF2 are the same as the set of second gamma curves Gamma2. The display voltage V1 of the sub-pixel when the display panel displays the sub-frame image during the second sub-frame SF2 is obtained based on the second gamma curve Gamma2 and the original grayscale G0 of the sub-pixel.

The set of first gamma curves Gamma1 corresponding to the second sub-frame SF2 is the same as the set of second gamma curves Gamma2, therefore, even if a conversion process where the original grayscale G0 is converted into the display voltage V1 and a conversion process where the display voltage V1 is converted into the display grayscale G1 are performed on the second sub-frame SF2, the finally obtained display grayscale G1 is the same as the original grayscale G0. Therefore, the conversion process can be saved. The original grayscale G0 of the sub-pixel in the frame image to be displayed is directly input when the display panel displays the sub-frame image during the second sub-frame SF2, and then the display voltage V1 corresponding to the sub-pixel in the second sub-frame SF2 can be obtained by using the second gamma curve Gamma2. In this way, there is no need to perform the conversion process where the original grayscale G0 is converted into the display voltage V1 and the conversion process where the display voltage V1 is converted into the display grayscale G1 on second sub-frame SF2 before displaying an image, thereby reducing the amount of data to be processed.

In some embodiments, with reference to FIG. 10 and FIG. 11, the second sub-frame SF2 is the last sub-frame SF among the N sub-frames SF, and the remaining (N−1) sub-frames SF each are the first sub-frame SF1.

In this way, the second sub-frame SF2 will not be sandwiched between the first sub-frames SF1, and the former N sub-frames SF are consecutive first sub-frames SF1. The operation of the driver chip when processing the data corresponding to the first sub-frame SF1 and inputting the display grayscale G1 to the first sub-frame SF1 is continuous, without performing operations on the second sub-frame SF2.

In an embodiment of the present disclosure, with reference to FIG. 4 and FIG. 5, the set of second gamma curves Gamma2 are different from the set of first gamma curves Gamma1, and the N sub-frames SF are the first sub-frames SF1. That is, before the display panel is driven to display the sub-frame image, the conversion process where the original grayscale G0 is converted into the display voltage V1 and then the conversion process where the display voltage V1 is converted into the display grayscale G1 are performed on each sub-frame SF. Then, when the display panel displays sub-frame images sequentially, the display grayscale G1 corresponding to the sub-frame is converted into the display voltage V1 by using the unified set of second gamma curves Gamma2 for each sub-frame. In this way, there is no need to perform gamma switching within one frame, thereby reducing the number of times of switching of the gamma curves within one frame.

In an embodiment of the present disclosure, 2≤N≤8. For example, N=4. In this case, by setting N to be within a range from 2 to 8, N is not too large, thereby avoiding too many times of writing a data voltage to the sub-pixel during one frame, and thus saving power consumption.

Figure 12:
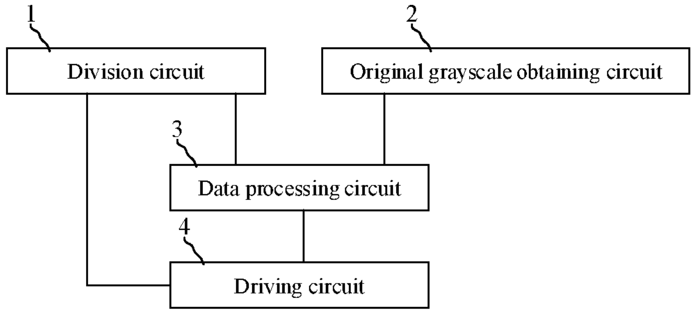
FIG. 12 is a schematic structural diagram of a device for driving a display panel according to an embodiment of the present disclosure.

FIG. 12 is a schematic structural diagram of a device for driving a display panel according to an embodiment of the present disclosure. An embodiment of the present disclosure provides a device for driving a display panel. In combination with FIG. 3 to FIG. 5 and FIG. 12, the device for driving the display panel includes a division circuit 1, an original grayscale obtaining circuit 2, a data processing circuit 3, and a driving circuit 4.

The division circuit 1 is configured to divide a frame into N sub-frames SF, and the N sub-frames SF respectively correspond to N sets of first gamma curves Gamma1. The sub-frames SF include at least two consecutive first sub-frames SF1, and at least two of the first sub-frames SF1 correspond to different sets of first gamma curves Gamma1, where N≥2.

The original grayscale obtaining circuit 2 is configured to obtain an original grayscale G0 of the sub-pixel according to a frame image to be displayed.

The data processing circuit 3 is electrically connected to the division circuit 1 and the original grayscale obtaining circuit 2, and is configured to obtain the display grayscale G1 of the sub-pixel in each first sub-frame SF1 based on the original grayscale G0 of the sub-pixel, the second gamma curve Gamma2, and the first gamma curve Gamma1 corresponding to each first sub-frame SF1.

The driving circuit 4 is electrically connected to the division circuit 1 and the data processing circuit 3, and is configured to drive the display panel to display sub-frame images sequentially during N sub-frames SF, and to obtain the display voltage V1 of the sub-pixel in a current first sub-frame SF1 based on the second gamma curve Gamma2 and the display grayscale G1 of the sub-pixel in the first sub-frame SF1 when the display panel is driven to display the sub-frame image during the first sub-frame SF1.

In combination with the above analysis, in the device for driving the display panel provided by the embodiments of the present disclosure, the data processing circuit 3 is provided on a path on which the display voltage is generated, and the data processing circuit 3 performs a conversion on the original grayscale G0, so that when the display panel is driven to display images sequentially during at least two first sub-frames SF1, the display voltage V1 corresponding to the sub-pixel in each first sub-frame SF1 can be obtained by only using one unified second gamma curve Gamma2 to convert the display grayscale G1 corresponding to each first sub-frame SF1 into the display voltage V1 (i.e., display grayscale G1–display voltage V1), without performing gamma switching at the beginning of each first sub-frame SF1. Therefore, the times for switching the gamma curves can be reduced, thereby reducing the requirements for the performance of the driver chip, and optimizing the high-frequency display of the display panel.

Figure 13:
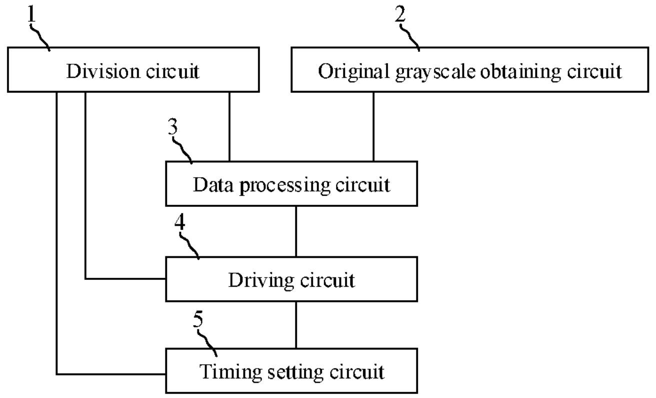
FIG. 13 is another structural schematic diagram of a device for driving a display panel according to an embodiment of the present disclosure.

FIG. 13 is another structural schematic diagram of a device for driving a display panel according to an embodiment of the present disclosure. In an embodiment of the present disclosure, with reference to FIG. 6 and FIG. 7, as shown in FIG. 13, the device for driving the display panel further includes a timing setting circuit 5, and the timing setting circuit 5 is electrically connected to the division circuit 1 and the driving circuit 4, and is configured to respectively set the light-emission durations for the N sub-frames SF. At least two of the sub-frames SF correspond to different light-emission durations. When the driving circuit 4 drives the display panel to display the sub-frame image during the sub-frame SF, the light-emission control signal corresponding to the light-emission duration corresponding to the current sub-frame SF is input to the display panel.

Such method for driving the display panel uses the pulse width modulation (PWM) driving and pulse amplitude modulation (PAM) driving to hybrid-drive the display panel. During each sub-frame SF, the display brightness of each sub-pixel in the sub-frame image is jointly determined by the display voltage V1 (or data voltage) of each sub-pixel and the light-emission duration corresponding to the sub-frame SF. This method for driving the display panel can solve the problem that the gamma grayscale cannot be displayed accurately caused by using only the PWM driving method, and it can also solve the problem of excessive large color gamut deviation of different grayscales and the problem of large power consumption at low grayscales, which are caused by only using the PAM method for driving a display panel alone. Therefore, the display effect can be optimized, for example, the display effect at low grayscales can be significantly optimized.

Figure 14:
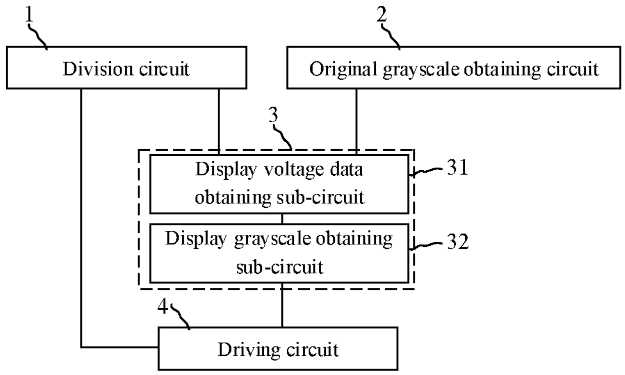
FIG. 14 is another structural schematic diagram of a device for driving a display panel according to an embodiment of the present disclosure.

FIG. 14 is another structural schematic diagram of a device for driving a display panel according to an embodiment of the present disclosure. In an embodiment of the present disclosure, with reference to FIG. 9, as shown in FIG. 14, the data processing circuit 3 includes a display voltage obtaining sub-circuit 31 and a display grayscale obtaining sub-circuit 32.

The display voltage obtaining sub-circuit 31 is electrically connected to the division circuit 1 and the original grayscale obtaining circuit 2, and is configured to obtain the display voltage V1 of the sub-pixel in the first sub-frame SF1 based on the first gamma curve Gamma1 corresponding to the first sub-frame SF1 and the original grayscale G0 of the sub-pixel. The display grayscale obtaining sub-circuit 32 is electrically connected to the display voltage obtaining sub-circuit 31 and the driving circuit 4, and is configured to obtain the display grayscale G1 of the sub-pixel in the first sub-frame SF1 based on the second gamma curve Gamma2 and the display voltage V1 of the sub-pixel in the first sub-frame SF1.

In the above configuration, the display voltage obtaining sub-circuit 31 realizes the conversion process where the original grayscale G0 is converted into the display voltage V1, and the display grayscale obtaining sub-circuit 32 realizes the conversion process where the display voltage V1 is converted into the display grayscale G1. When the display panel displays sub-frame images sequentially during consecutive first sub-frames SF1, the display grayscale G1 corresponding to the first sub-frame SF1 is converted by using the second gamma curve Gamma2 for each first sub-frame SF1. The display voltage V1 obtained after the conversion is the display voltage V1 matching the first gamma curve Gamma1 corresponding to the first sub-frame SF1.

Figure 15:
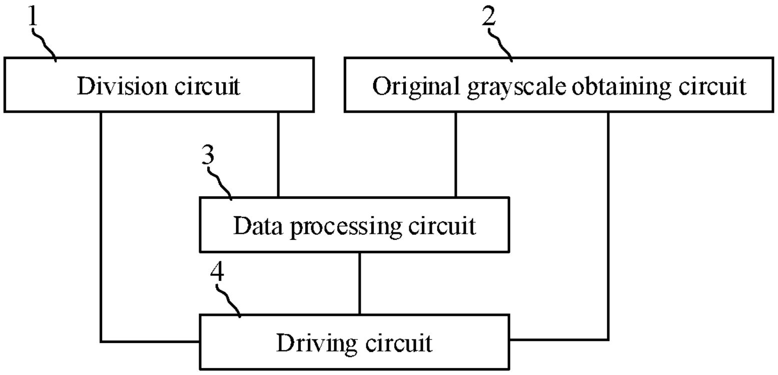
FIG. 15 is another structural schematic diagram of a device for driving a display panel according to an embodiment of the present disclosure.

FIG. 15 is another structural schematic diagram of a device for driving a display panel according to an embodiment of the present disclosure. In an embodiment of the present disclosure, with reference to FIG. 10, FIG. 11, and FIG. 15, the sub-frames SF include a second sub-frame SF2, and one set of first gamma curves Gamma1 corresponding to the second sub-frame SF2 are the same as the set of second gamma curves Gamma2. The driving circuit 4 is also electrically connected to the original grayscale obtaining circuit 2. When the driving circuit 4 drives the display panel to display the sub-frame image during the second sub-frame SF2, the display voltage V1 of the sub-pixel in the second sub-frame SF2 is obtained based on the second gamma curve Gamma2 and the original grayscale G0 of the sub-pixel.

The set of first gamma curves Gamma1 corresponding to the second sub-frame SF2 is the same as the set of second gamma curve Gamma2, therefore, even if a conversion process where the original grayscale G0 is converted into the display voltage V1 and a conversion process where the display voltage V1 is converted into the display grayscale G1 are performed on the second sub-frame SF2, the finally obtained display grayscale G1 is the same as the original grayscale G0. Therefore, the conversion process can be saved. The original grayscale G0 of the sub-pixel in the frame image to be displayed is directly input when the display panel displays the sub-frame image during the second sub-frame SF2, and then the display voltage V1 corresponding to the sub-pixel in the second sub-frame SF2 can be obtained by using the second gamma curve Gamma2. In this way, there is no need to perform the conversion process where the original grayscale G0 is converted into the display voltage V1 and the conversion process where the display voltage V1 is converted into the display grayscale G1 on second sub-frame SF2 before displaying an image, thereby reducing the amount of data to be processed.

In an embodiment of the present disclosure, with reference to FIG. 10 and FIG. 11, the second sub-frame SF2 is the last sub-frame SF among the N sub-frames SF, and the remaining (N−1) sub-frames SF each are the first sub-frame SF1. In this way, the second sub-frame SF2 is not sandwiches between the first sub-frames SF1, and the former N sub-frames SF are consecutive first sub-frames SF1. The operation of the driver chip when processing the data corresponding to the first sub-frame SF1 and inputting the display grayscale G1 to the first sub-frame SF1 is continuous, without performing operations on the second sub-frame SF2.

In an embodiment of the present disclosure, with reference to FIG. 4 and FIG. 5, the set of second gamma curves Gamma2 are different from the set of first gamma curves Gamma1, and the N sub-frames SF each are the first sub-frame SF1. That is, before the display panel is driven to display the sub-frame image, the conversion process where the original grayscale G0 is converted into the display voltage V1 and the conversion process where the display voltage V1 is converted into the display grayscale G1 are performed on each sub-frame SF. Then, when the display panel displays sub-frame images sequentially, the display grayscale G1 corresponding to the sub-frame is converted into the display voltage V1 by using the unified second gamma curve Gamma2 for each sub-frame. In this way, there is no need to perform gamma switching within one frame, thereby reducing the number of times of switching of the gamma curves within one frame.

Based on another aspect of the present disclosure, a non-volatile computer-readable storage medium is provided, the non-volatile computer-readable storage medium stores computer program instructions, and the computer program instructions, when executed by a processor, cause the processor to perform the foregoing method for driving the display panel.

In an embodiment, the device for driving the display panel includes a processor; and a memory configured to store instructions executable by the processor. The processor is configured to perform the steps executed by the device for driving the display panel in the foregoing method embodiments.

Figure 16:
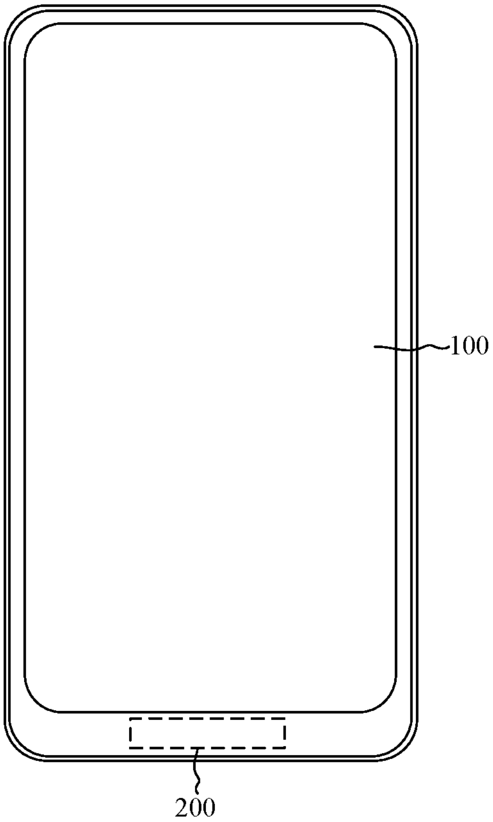
FIG. 16 is a schematic structural diagram of a display device according to an embodiment of the present disclosure.

An embodiment of the present disclosure provides a display device. FIG. 16 is a schematic structural diagram of a display device according to an embodiment of the present disclosure. As shown in FIG. 16, the display device includes a display panel 100 and the device for driving the display panel 200 described above. A structure of the device for driving the display panel 200 has been described in detail in the foregoing embodiments, and will not be repeated herein. The display device shown in FIG. 16 is only a schematic illustration, and the display device may be any electronic device with a display function, such as a mobile phone, a tablet computer, a notebook computer, an electronic paper book, or a television.

The above embodiments are merely exemplary embodiments of the present disclosure and are not intended to limit the present disclosure. Any modifications, equivalent substitutions, and improvements made within the principle of the present disclosure shall fall into the protection scope of the present disclosure.

Finally, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A method for driving a display panel, comprising:

dividing a frame into N sub-frames, the N sub-frames corresponding to N sets of first gamma curves, respectively, the N sub-frames comprising at least two consecutive first sub-frames, and at least two of the at least two consecutive first sub-frames corresponding to different sets of first gamma curves of the N sets of first gamma curves, where N≥2;

obtaining a display grayscale of a sub-pixel in each first sub-frame of the at least two consecutive first sub-frames based on an original grayscale of the sub-pixel in a frame image to be displayed, a set of second gamma curves, and one set of first gamma curves of the N sets of first gamma curves corresponding to the first sub-frame; and driving the display panel to display sub-frame images sequentially during the N sub-frames, respectively, wherein a display voltage of the sub-pixel when the display panel displays one of the sub-frame images during one of the at least two consecutive first sub-frames is obtained based on the set of second gamma curves and the display grayscale of the sub-pixel in the first sub-frame.

2. The method according to claim 1, further comprising:

setting light-emission durations for the N sub-frames, respectively, at least two sub-frames of the N sub-frames having different light-emission durations; and inputting a light-emission control signal corresponding to a light-emission duration corresponding to a current sub-frame of the N sub-frames to the display panel when the display panel displays one sub-frame image of the sub-frame images during the current sub-frame.

3. The method according to claim 2, wherein the N sub-frames respectively have N light-emission durations different from each other.

4. The method according to claim 2, wherein display grayscales corresponding to the N sub-frames increase sequentially, and the light-emission durations corresponding to the N sub-frames increase sequentially.

5. The method according to claim 1, wherein said obtaining the display grayscale of the sub-pixel in the one first sub-frame of the at least two consecutive first sub-frames based on the original grayscale of the sub-pixel in the frame image to be displayed, the set of second gamma curves, and the one set of first gamma curves corresponding to the first sub-frame, comprises:

obtaining a display voltage of the sub-pixel in the first sub-frame based on the one set of first gamma curves corresponding to the first sub-frame and the original grayscale of the sub-pixel; and obtaining the display grayscale of the sub-pixel in the first sub-frame based on the set of second gamma curves and the display voltage of the sub-pixel in the first sub-frame.

6. The method according to claim 1, wherein the set of second gamma curves are identical to at least one set of first gamma curves of the N sets of first gamma curves.

7. The method according to claim 6, wherein the N sub-frames further comprise a second sub-frame, wherein another one set of first gamma curves of the N sets of first gamma curves corresponding to the second sub-frame are the same as the set of second gamma curves; and wherein the display voltage of the sub-pixel when the display panel displays one of the sub-frame images during the second sub-frame is obtained based on the set of second gamma curves and the original grayscale of the sub-pixel.

8. The method according to claim 7, wherein the second sub-frame is a last sub-frame of the N sub-frames, and each of the remaining (N−1) sub-frames of the N sub-frames is one of the at least two consecutive first sub-frames.

9. The method according to claim 1, wherein the set of second gamma curves are different from the N sets of first gamma curves, and each of the N sub-frames is one of the at least two consecutive first sub-frames.

10. The method according to claim 1, wherein 2≤N≤8.

11. A device for driving a display panel, comprising:

a division circuit configured to divide a frame into N sub-frames, wherein the N sub-frames correspond to N sets of first gamma curves, respectively, the N sub-frames comprise at least two consecutive first sub-frames, and at least two of the at least two consecutive first sub-frames correspond to different sets of first gamma curves of the N sets of first gamma curves, where N≥2;

an original grayscale obtaining circuit configured to obtain an original grayscale of a sub-pixel based on a frame image to be displayed;

a data processing circuit electrically connected to the division circuit and the original grayscale obtaining circuit, and configured to obtain a display grayscale of the sub-pixel in each first sub-frame of the at least two consecutive first sub-frames based on the original grayscale of the sub-pixel in the frame image to be displayed, a set of second gamma curves, and one set of first gamma curves of the N sets of first gamma curves corresponding to the first sub-frame; and a driving circuit electrically connected to the division circuit and the data processing circuit, and configured to drive the display panel to display sub-frame images sequentially during the N sub-frames, and obtain a display voltage of the sub-pixel when the display panel displays one of the sub-frame images during one of the at least two consecutive first sub-frames based on the set of second gamma curves and the display grayscale of the sub-pixel in the first sub-frame.

12. The device for driving the display panel according to claim 11, further comprising:

a timing setting circuit electrically connected to the division circuit and the driving circuit, wherein the timing setting circuit is configured to set light-emission durations for the N sub-frames, respectively, at least two sub-frames of the N sub-frames having different light-emission durations; and wherein the timing setting circuit is further configured to input a light-emission control signal corresponding to the light-emission duration corresponding to a current sub-frame of the N sub-frames to the display panel when the driving circuit drives the display panel to display one sub-frame image of the sub-frame images during the current sub-frame.

13. The device for driving the display panel according to claim 11, wherein the data processing circuit comprises:

a display voltage obtaining sub-circuit electrically connected to the division circuit and the original grayscale obtaining circuit, and configured to obtain display voltage of a sub-pixel in each of the at least two consecutive first sub-frames based on the one set of first gamma curves corresponding to the first sub-frame and the original grayscale of the sub-pixel; and a display grayscale obtaining sub-circuit electrically connected to the display voltage obtaining sub-circuit and the driving circuit, and configured to obtain a display grayscale of the sub-pixel in one of the at least two consecutive first sub-frames based on the set of second gamma curves and the display voltage of the sub-pixel in the first sub-frame.

14. The device for driving the display panel according to claim 13, wherein the N sub-frames further comprise a second sub-frame, and another one set of first gamma curves of the N sets of first gamma curves corresponding to the second sub-frame is the same as the set of second gamma curves; and wherein the driving circuit is further electrically connected to the original grayscale obtaining circuit, and when the driving circuit drives the display panel to display the sub-frame image during the second sub-frame, a display voltage of the sub-pixel in the second sub-frame is obtained based on the set of second gamma curves and the original grayscale of the sub-pixel.

15. The device for driving the display panel according to claim 14, wherein the second sub-frame is a last sub-frame of the N sub-frames, and each of the remaining (N−1) sub-frames of the N sub-frames is one of the at least two consecutive first sub-frames.

16. The device for driving the display panel according to claim 11, wherein the set of second gamma curves are different from the N sets of first gamma curves, and each of the N sub-frames is one of the at least two consecutive first sub-frames.

17. A display device, comprising a display panel and a device for driving the display panel, wherein the device for driving the display panel comprises:

a division circuit configured to divide a frame into N sub-frames, wherein the N sub-frames correspond to N sets of first gamma curves, respectively, the N sub-frames comprise at least two consecutive first sub-frames, and at least two of the at least two consecutive first sub-frames correspond to different sets of first gamma curves of the N sets of first gamma curves, where N≥2;

an original grayscale obtaining circuit configured to obtain an original grayscale of a sub-pixel based on a frame image to be displayed;

a data processing circuit electrically connected to the division circuit and the original grayscale obtaining circuit, and configured to obtain a display grayscale of the sub-pixel in each first sub-frame of the at least two consecutive first sub-frames based on the original grayscale of the sub-pixel in the frame image to be displayed, a set of second gamma curves, and one set of first gamma curves of the N sets of first gamma curves corresponding to the first sub-frame; and a driving circuit electrically connected to the division circuit and the data processing circuit, and configured to drive the display panel to display sub-frame images sequentially during the N sub-frames, and obtain a display voltage of the sub-pixel when the display panel displays one of the sub-frame images during one of the at least two consecutive first sub-frames based on the set of second gamma curves and the display grayscale of the sub-pixel in the first sub-frame.

18. The display device according to claim 17, wherein the device for driving the display panel further comprises:

a timing setting circuit electrically connected to the division circuit and the driving circuit, wherein the timing setting circuit is configured to configure light-emission durations for the N sub-frames, respectively, at least two sub-frames of the N sub-frames having different light-emission durations; and wherein the timing setting circuit is further configured to input a light-emission control signal corresponding to a light-emission duration corresponding to a current sub-frame of the N sub-frames to the display panel when the driving circuit drives the display panel to display one sub-frame image of the sub-frame images during the current sub-frame.

19. The display device according to claim 17, wherein the data processing circuit comprises:

a display voltage obtaining sub-circuit electrically connected to the division circuit and the original grayscale obtaining circuit, and configured to obtain display voltage of a sub-pixel in each of the at least two consecutive first sub-frames based on the one set of first gamma curves corresponding to the first sub-frame and the original grayscale of the sub-pixel; and a display grayscale obtaining sub-circuit electrically connected to the display voltage obtaining sub-circuit and the driving circuit, and configured to obtain a display grayscale of the sub-pixel in one of the at least two consecutive first sub-frames based on the set of second gamma curves and the display voltage of the sub-pixel in the first sub-frame.

20. The display device according to claim 19, wherein the N sub-frames further comprise a second sub-frame, and another one set of first gamma curves of the N sets of first gamma curves corresponding to the second sub-frame is the same as the set of second gamma curves; and wherein the driving circuit is further electrically connected to the original grayscale obtaining circuit, and when the driving circuit drives the display panel to display the sub-frame image during the second sub-frame, a display voltage of the sub-pixel in the second sub-frame is obtained based on the set of second gamma curves and the original grayscale of the sub-pixel.

* * * * *